US007571597B2

(12) United States Patent
Delaloye

(10) Patent No.: US 7,571,597 B2
(45) Date of Patent: Aug. 11, 2009

(54) AIRFRAME MOUNTED MOTOR DRIVEN LUBRICATION PUMP CONTROL SYSTEM AND METHOD

(75) Inventor: Jim E. Delaloye, Mesa, AZ (US)

(73) Assignee: Honeywell International Inc., Morristown, PA (US)

( * ) Notice: Subject to any disclaimer, the term of this patent is extended or adjusted under 35 U.S.C. 154(b) by 528 days.

(21) Appl. No.: 11/339,160

(22) Filed: Jan. 25, 2006

(65) Prior Publication Data

US 2007/0169997 A1 Jul. 26, 2007

(51) Int. Cl.
*F02C 7/06* (2006.01)

(52) U.S. Cl. ..................................... 60/39.08; 184/6.11

(58) Field of Classification Search ................ 60/39.08; 184/6.11

See application file for complete search history.

(56) References Cited

U.S. PATENT DOCUMENTS 3,856,114 A 12/1974 Zanki
4,445,168 A 4/1984 Petryszyn
4,569,196 A 2/1986 Waddington et al.
4,629,033 A 12/1986 Moore et al.
4,717,000 A 1/1988 Waddington et al.
5,066,197 A * 11/1991 Champagne ................. 417/18
5,067,454 A * 11/1991 Waddington et al. ..... 123/196 S
5,121,599 A * 6/1992 Snyder et al. ................. 60/779
5,152,141 A 10/1992 Rumford et al.
5,180,034 A 1/1993 Lopes
5,553,449 A 9/1996 Rodgers et al.
5,597,051 A 1/1997 Moriya et al.
6,125,969 A 10/2000 Graf et al.
6,167,318 A 12/2000 Kizer et al.
6,216,822 B1 4/2001 May et al.
6,246,950 B1 6/2001 Bessler et al.
6,353,790 B1 3/2002 Tsuzuki
6,374,950 B1 4/2002 Takeno
6,834,739 B2 12/2004 Iyoda et al.
6,941,217 B1 9/2005 Munson, Jr.
2001/0047647 A1 * 12/2001 Cornet ...................... 60/39.02
2006/0054406 A1 * 3/2006 Delaloye .................. 184/6.11

* cited by examiner

*Primary Examiner*—Michael Cuff
*Assistant Examiner*—Phutthiwat Wongwian
(74) *Attorney, Agent, or Firm*—Ingrassia Fisher & Lorenz, P.C.

(57) ABSTRACT

A system and method for precisely controlling lubricant supply flow to one or more rotating machines in an aircraft includes a motor, a pump, and a motor control unit. The motor is coupled to receive motor speed commands and, in response to the commands, rotates at the commanded motor speed and supplies a drive force to the pump. The pump, upon receipt of the drive force, draws lubricant from a lubricant source and supplies it to a rotating machine. The motor control unit determines a scheduled lubricant supply pressure based at least in part on lubricant temperature, rotating machine rotational speed, and one or more aircraft operating conditions, and to supplies the motor speed commands to the motor that cause the pump to supply lubricant at the scheduled lubricant supply pressure.

11 Claims, 1 Drawing Sheet

AIRFRAME MOUNTED MOTOR DRIVEN LUBRICATION PUMP CONTROL SYSTEM AND METHOD

STATEMENT REGARDING FEDERALLY SPONSORED RESEARCH OR DEVELOPMENT

This invention was made with Government support under Contract No. N00019-02-C-3002, awarded by the U.S. Navy. The Government has certain rights in this invention.

TECHNICAL FIELD

The present invention relates to rotating machine lubrication and, more particularly, to a system and method for controlling lubricant supply flow to one or more rotating machines in an aircraft.

BACKGROUND

Aircraft gas turbine engines are typically supplied with lubricant from a pump driven lubricant supply system. In particular, the lubrication supply pump, which may be part of a pump assembly having a plurality of pumps on a common shaft, draws lubricant from a lubricant reservoir, and increases the pressure of the lubricant. The lubricant is then delivered, via an appropriate piping circuit, to the engine. The lubricant is directed, via appropriate flow circuits within the engine, to the various engine components that may need lubrication, and is collected in one or more recovery sumps in the engine. One or more of the pump assembly pumps then draws the lubricant that collects in the recovery sumps and returns the lubricant back to the reservoir.

In many instances, the pump assembly pumps are implemented as positive displacement pumps, which are driven by the engine via an interposed gearbox assembly. Thus, the speed of the pumps is directly proportional to the rotational speed of the engine. As a result, lubricant flow rate to the engine is controlled solely based on engine speed. However, the lubrication needs of the engine may also vary with other parameters, not just its own rotational speed. For example, the engine lubrication need may vary with engine load and the speed variations, with lubricant temperature, and with external pressure and temperature, which vary with aircraft altitude.

In view of the foregoing, many aircraft gas turbine engine lubrication supply pumps may be designed to supply lubricant to the engine under certain specified design conditions, which may be, for example, the most unfavorable operating condition expected. For example, the supply pump may be designed to supply design intent flow at maximum aircraft altitude, and highest expected lubricant temperature. This approach may result in an over-sizing of the pumps, and thus excess lubricant flow, when conditions differ from the design conditions. Typically, this excess lubricant flow is controlled by implementing a recycle control system, in which a pressure regulating valve downstream of the lubricant supply pump bypasses excess lubricant flow back to the suction side of the pump.

Although the above-described lubricant supply system is generally safe, reliable, and robust, it does suffer certain drawbacks. For example, because the lubricant pumps are over-sized, the system piping circuit may also need to be over-sized, which can increase overall system size and weight, the pumps may needlessly dissipate energy at many operating conditions, and/or excess lubricant may be supplied to and present in the engine.

Hence, there is a need for an aircraft engine lubricant supply system that does not use over-sized pumps and/or system piping, and/or that does not needlessly dissipate energy at many operating conditions, and/or does not supply excess lubricant to the engine. The present invention addresses one or more of these needs.

BRIEF SUMMARY

The present invention provides a system and method that more precisely controls lubricant supply flow to one or more rotating machines in an aircraft, and that does not rely on an oversized supply pump, supply system piping, and/or a recycle flow control system.

In one embodiment, and by way of example only, an aircraft lubrication supply system includes a motor, a pump, and a motor control unit. The motor is coupled to receive motor speed commands representative of a commanded motor speed and is operable, in response thereto, to rotate at the commanded motor speed and supply a drive force. The pump has at least a fluid inlet that is adapted to couple to a lubricant source, and a fluid outlet. The pump is coupled to receive the drive force from the motor and is configured, in response thereto, to draw lubricant from the lubricant source into the fluid inlet and supply lubricant, via the fluid outlet, to a rotating machine. The motor control unit is coupled to receive a signal representative of lubricant temperature, a signal representative of rotating machine rotational speed, and one or more signals representative of aircraft operating conditions. The motor control unit is operable to determine a scheduled lubricant supply pressure based at least in part on the lubricant temperature, the rotating machine rotational speed, and the one or more aircraft operating conditions, and to supply motor speed commands to the motor that cause the pump to supply lubricant at the scheduled lubricant supply pressure.

In another exemplary embodiment, an aircraft lubrication supply system includes a motor, a pump, a lubricant filter, a filter outlet pressure, and a motor control unit. The motor is coupled to receive motor speed commands representative of a commanded motor speed and is operable, in response thereto, to rotate at the commanded motor speed and supply a drive force. The pump has at least a fluid inlet adapted to couple to a lubricant source, and a fluid outlet. The pump is coupled to receive the drive force from the motor and is configured, in response thereto, to draw lubricant from the lubricant source into the fluid inlet and supply lubricant, via the fluid outlet, to a rotating machine. The lubricant filter has a filter inlet coupled to receive at least a portion of the lubricant supplied via the pump fluid outlet, and a filter outlet. The lubricant filter is configured to filter the lubricant received thereby and discharge filtered lubricant via the filter outlet. The filter outlet pressure sensor is disposed downstream of the filter outlet, and is configured to sense filter outlet pressure and supply a pressure feedback signal representative thereof. The motor control unit is coupled to receive a signal representative of lubricant temperature, a signal representative of rotating machine rotational speed, one or more signals representative of aircraft operating conditions, and the pressure feedback signal. The motor control unit is operable to determine a scheduled lubricant supply pressure based at least in part on the lubricant temperature, the rotating machine rotational speed, and the one or more aircraft operating conditions. The motor control unit is further operable to supply motor speed commands to the motor that cause the pump to supply lubricant at the scheduled lubricant supply pressure, determine actual lubricant supply pressure, and compare the actual lubricant supply pressure to the scheduled lubricant supply pressure.

In yet another exemplary embodiment, a method of controlling pressure of a lubricant supplied to a rotating machine in an aircraft includes the steps of determining lubricant temperature, determining rotational speed of the rotating machine, and determining one or more operating conditions of the aircraft. A scheduled lubricant supply pressure is determined based at least in part on the lubricant temperature, the rotating machine rotational speed, and the one or more aircraft operating conditions. A variable-speed pump is driven at a speed that will supply the lubricant at the scheduled lubricant supply pressure.

Other independent features and advantages of the preferred lubrication pump control system and method will become apparent from the following detailed description, taken in conjunction with the accompanying drawings which illustrate, by way of example, the principles of the invention.

DETAILED DESCRIPTION OF A PREFERRED EMBODIMENT

Figure 1:
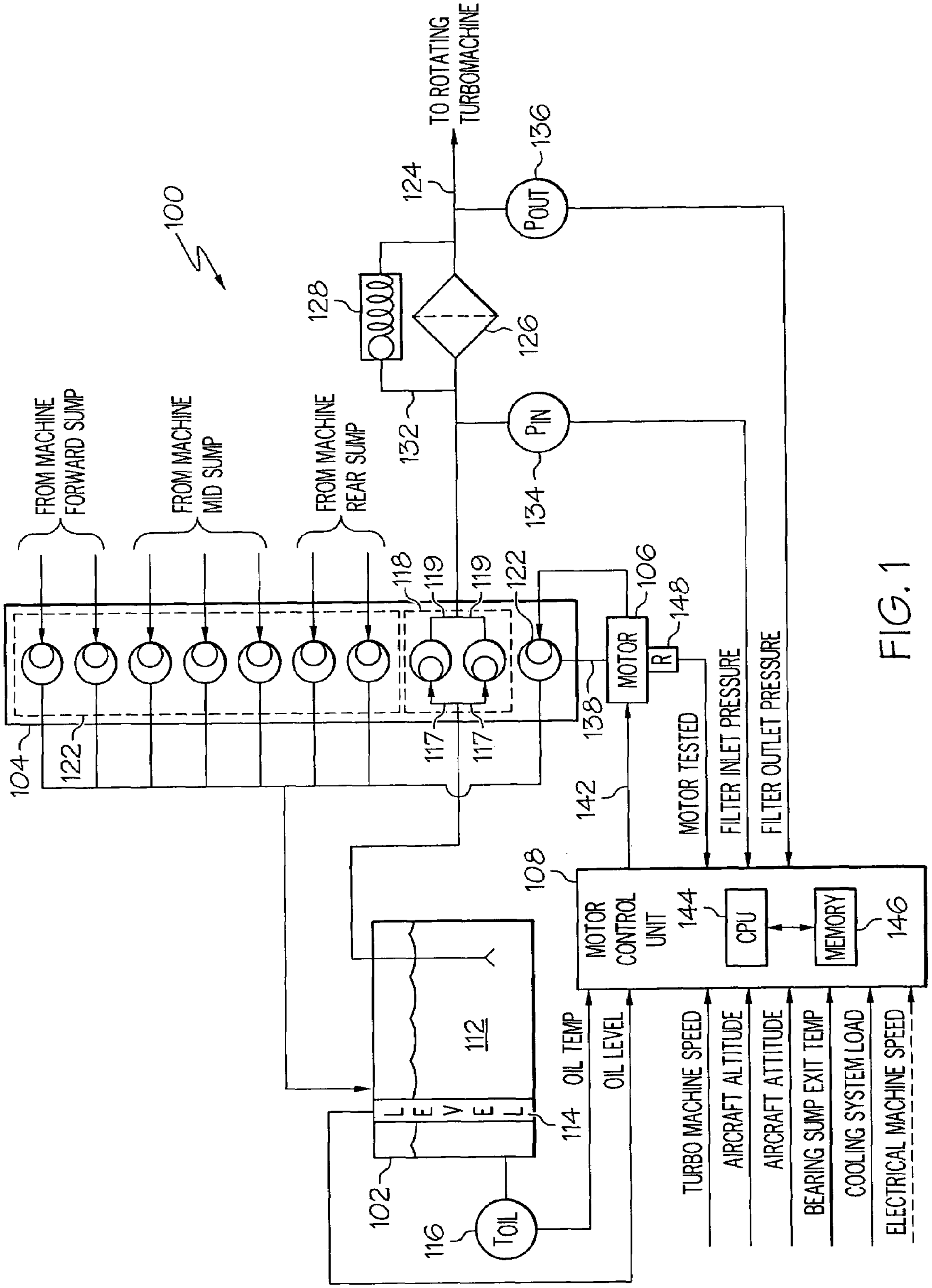
FIG. 1, which is the sole FIGURE, is a schematic diagram of an aircraft lubrication supply system according to an exemplary embodiment of the present invention.

The following detailed description is merely exemplary in nature and is not intended to limit the invention or its application and uses. Furthermore, there is no intention to be bound by any theory presented in the preceding background or the following detailed description. In this regard, although the system is depicted and described as supplying lubricant to a turbomachine, it will be appreciated that the invention is not so limited, and that the system and method described herein may be used to supply lubricant to any one of numerous airframe mounted rotating machines.

With reference now to FIG. 1, a schematic diagram of an exemplary aircraft lubrication supply system 100 is depicted, and includes a reservoir 102, a pump assembly 104, a motor 106, and a motor control unit 108. The reservoir 102 is used to store a supply of lubricant 112 such as, for example, oil or other suitable hydraulic fluid. A level sensor 114 and a temperature sensor 116 are installed within, or on, the reservoir 102. The level sensor 114 senses the level of lubricant in the reservoir 102 and supplies a level signal representative of the sensed level to the motor control unit 108. The temperature sensor 116 senses the temperature of the lubricant in the reservoir 102 and supplies a temperature signal representative of the sensed temperature to the motor control unit 108. It will be appreciated that the level sensor 114 and the temperature sensor 116 may be implemented using any one of numerous types of level and temperature sensors, respectively, that are known now or that may be developed in the future.

The pump assembly 104 is configured to draw lubricant from, and return used lubricant to, the reservoir 102. In the depicted embodiment the pump assembly 104 includes a plurality of supply pumps 118 and a plurality of return pumps 122. The supply pumps 118 each include a fluid inlet 117 and a fluid outlet 119. The supply pump fluid inlets 117 are each coupled to the reservoir 102, and the supply pump fluid outlets are each coupled to a lubricant supply conduit 124. The supply pumps 118, when driven, draw lubricant 112 from the reservoir 102 into the fluid inlets 117 and discharge the lubricant, at an increased pressure, into the fluid supply conduit 124, via the fluid outlets 119. The lubricant supply conduit 124, among other potential functions, supplies the lubricant to one or more rotating machines. Although one or more various types of machines could be supplied with the lubricant, in the depicted embodiment the lubricant is supplied to a rotating turbomachine. It will be appreciated that each of the pumps 118, 122 that comprise the pump assembly 104 could be implemented as any one of numerous types of centrifugal or positive displacement type pumps, but in the preferred embodiment each pump 118, 122 is implemented as a positive displacement pump.

As FIG. 1 also depicts, a lubricant filter 126 is disposed within the lubricant supply conduit 124. The lubricant filter 126 removes any particulate or other debris that may be present in lubricant before it is supplied to the turbomachine. A filter bypass valve 128, and appropriate bypass piping 132, are disposed in parallel with the lubricant filter 126. The bypass valve 128 is configured such that it is normally in a closed position, and moves to the open position when a predetermined differential pressure exists across it. Thus, if the lubricant filter 126 becomes clogged and generates a sufficiently high differential pressure, the bypass valve 128 will open to ensure a sufficient flow of lubricant to the turbomachine is maintained.

The lubricant supply conduit 124 also includes a pair of pressure sensors, a filter inlet pressure sensor 134 and a filter outlet pressure sensor 136. The pressure sensors are each operable to sense lubricant pressure and to supply a pressure signal representative of the sensed pressure to the motor control unit 108. As the assigned nomenclature connotes, the filter inlet pressure sensor 134 senses lubricant pressure at the inlet to the lubricant filter 126, and the filter outlet pressure sensor 136 senses lubricant pressure at the outlet of the lubricant filter 126. It will be appreciated that the depicted configuration is merely exemplary of a particular preferred embodiment, and that the system 100 could be implemented with more or less than this number of pressure sensors. For example, the system 100 could be implemented with only the filter inlet pressure sensor 134 or only the filter outlet pressure sensor 136, or a plurality of filter inlet pressures sensors 134 and filter outlet pressure sensors 136.

The lubricant that is supplied to the rotating turbomachine flows to various components within the turbomachine and is collected in one or more sumps in the turbomachine. The lubricant that is collected in the turbomachine sumps is then returned to the reservoir 102 for reuse. To do so, a plurality of the return pumps 122 draws used lubricant from the turbomachine sumps and discharges the used lubricant back into the reservoir 102 for reuse. Before proceeding further it will be appreciated that the configuration of the pump assembly 104 described herein is merely exemplary, and that the pump assembly 104 could be implemented using any one of numerous other configurations. For example, the pump assembly 104 could be implemented with a single supply pump 118 and a single return pump 122, or with just one or more supply pumps 118. No matter how many supply or return pumps 118, 122 are used to implement the pump assembly 104, it is seen that each pump 118, 122 is mounted on a common pump assembly shaft 138 and is driven via a drive force supplied from the motor 106.

The motor 106 is coupled to receive motor speed commands 142 from the motor control unit 108 that are representative of a commanded motor rotational speed. In response to the motor speed commands the motor 106 rotates at the commanded speed and, as just noted, supplies a drive force to the pump assembly 104 that drives the pumps 118, 122 at the speed that will supply lubricant at a set supply pressure. In the depicted embodiment the motor 106 is directly coupled to the pump assembly shaft 138 and thus rotates the pump assembly shaft 138 at the commanded rotational speed. It will be appreciated, however, that the motor 106, if needed or desired, could be coupled to the pump assembly shaft 138 via one or more gear assemblies, which could be configured to either step up or step down the motor speed. It will additionally be appreciated that the motor 106 could be implemented as any one of numerous types of AC or DC motors, but in a particular preferred embodiment the motor 106 is implemented as a brushless DC motor.

As noted above, motor speed commands 142 are supplied to the motor 106 from the motor control unit 108. The motor control unit 108 implements control logic via, for example, a central processing unit 144 that generates the motor speed commands. The control logic implements a predefined schedule of lubricant supply pressure as a function of various lubrication system, turbomachine, and aircraft operating conditions. More specifically, the motor control unit 108 receives a signals representative of various ones of these parameters. In response to these signals, the control logic in the motor control unit 108 determines the scheduled lubricant supply pressure based on these parameters, and generates motor speed commands that will cause the motor 106 to rotate at least the supply pumps 118 at a speed that will supply lubricant at the scheduled lubricant supply pressure.

It will be appreciated that the parameters on which the lubricant supply pressure schedule is based may vary. For example, in the depicted embodiment the motor control unit 108 receives signals representative of lubricant temperature, including both lubricant supply temperature and turbomachine bearing sump lubricant exit temperature, lubricant level, turbomachine speed, aircraft altitude, and aircraft attitude. It will additionally be appreciated that these parameters are merely exemplary and that additional parameters, such as cooling system load and/or electrical system load, which are shown in phantom in FIG. 1, could also be used, depending on the overall lubrication system 100 implementation and configuration.

No matter the specific parameters on which the pressure schedule is based, the control logic preferably implements a closed-loop control law that uses a pressure feedback signal to determine actual lubricant supply pressure. Thus, as shown in FIG. 1, the filter outlet pressure sensor 136 supplies a signal representative of filter outlet pressure to the motor control unit 108. During normal system 100 operations, the filter outlet pressure signal is used by the control logic as the pressure feedback signal. To provide fault tolerance to the system 100, it is seen that the filter inlet pressure sensor 134 also supplies a pressure signal to the motor control unit 108. This signal, which is representative of filter inlet pressure, is used if the filter outlet pressure sensor 136 is determined to be inoperable. To make this determination, the motor control unit 108 preferably implements one or more built-in-test (BIT) procedures.

If the filter inlet pressure signal from the filter inlet pressure sensor 134 is used as the pressure feedback signal, the motor control unit 108 approximates the lubricant supply pressure to the turbomachine by adding a filter pressure drop value to the sensed filter inlet pressure. More specifically, during normal system 100 operations, when the filter outlet pressure sensor 136 is determined to be operating properly, the motor control unit 108 periodically determines the pressure drop across the filter 126 by, for example, subtracting the sensed filter outlet pressure from the sensed filter inlet pressure. The determined filter pressure drop is then stored in, for example, a memory 146. Then, if the BIT procedures determine the filter outlet pressure sensor 136 is inoperable, the control law in the motor control unit 108 uses the filter inlet pressure signal and the filter pressure drop value that was stored most recently before the filter outlet pressure sensor 136 was determined to be inoperable to determine actual lubricant supply pressure.

It will be appreciated that the use of filter inlet pressure to provide fault tolerance is merely exemplary and that other signals could additionally or instead be used. For example, turbomachine bearing sump lubricant exit temperature could also be used to additionally or alternatively implement closed-loop control. Moreover, as FIG. 1 additionally shows, a rotational speed sensor 148 such as, for example, a resolver unit may be coupled to the motor 106. The rotational speed sensor 148, if included, is configured to sense motor rotational speed and provide a signal representative thereof to the motor control unit 108. With this additional feedback signal, if the motor control unit 108 determines that the filter outlet pressure sensor 136 is inoperable, the motor control unit 108 can instead implement a predefined schedule of motor speed as a function of the various lubrication system, turbomachine, and aircraft operating conditions. Thus, rather than implementing a closed-loop pressure control law, the motor control unit 108 will implement a closed-loop speed control law, using the motor rotational speed signal supplied from the rotational speed sensor 148 as the feedback signal. As was alluded to above, the closed-loop speed control law may be used to provide either an additional or alternate level of fault tolerance for the system 100.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. An aircraft lubrication supply system, comprising:

a motor coupled to receive motor speed commands representative of a commanded motor speed and operable, in response thereto, to rotate at the commanded motor speed and supply a drive force;

a pump having at least a fluid inlet and a fluid outlet, the fluid inlet adapted to couple to a lubricant source, the pump coupled to receive the drive force from the motor and configured, in response thereto, to draw lubricant from the lubricant source into the fluid inlet and supply lubricant, via the fluid outlet, to a rotating machine;

a lubricant filter having a filter inlet and a filter outlet, the filter inlet coupled to receive at least a portion of the lubricant supplied via the pump fluid outlet, the lubricant filter configured to filter the lubricant received thereby and discharge filtered lubricant via the filter outlet;

a filter inlet pressure sensor disposed upstream of the filter inlet, the filter inlet pressure sensor configured to sense filter inlet pressure and supply a filter inlet pressure signal representative thereof;

a filter outlet pressure sensor disposed downstream of the filter outlet, the filter outlet pressure sensor configured to sense filter outlet pressure and supply a filter outlet pressure signal representative thereof;

a motor control unit coupled to receive the filter inlet pressure signal, the filter outlet pressure signal, one or more signals representative of lubricant temperature, a signal representative of rotating machine rotational speed, and one or more signals representative of aircraft operating conditions, the motor control unit operable to:

(i) determine a scheduled lubricant supply pressure based at least in part on the lubricant temperature, the rotating machine rotational speed, and the one or more aircraft operating conditions, (ii) supply motor speed commands to the motor that cause the pump to supply lubricant at the scheduled lubricant supply pressure, (iii) implement a closed-loop pressure control law that uses a pressure feedback signal to determine actual lubricant supply pressure, (iv) compare the actual lubricant supply pressure to the scheduled lubricant supply pressure, and (v) determine operability of the filter outlet pressure sensor, wherein the motor control unit uses the filter outlet pressure signal as the pressure feedback signal if the filter outlet pressure sensor is determined to be operating properly and uses the filter inlet pressure signal as the pressure feedback signal if the filter outlet pressure sensor is determined to not be operating properly.

2. The system of claim 1, wherein the motor control unit is further operable to (i) determine a pressure drop across the filter based on the sensed filter inlet pressure and sensed filter outlet pressures and (ii) store one or more values representative of thereof.

3. The system of claim 2, wherein the motor control unit is further operable, upon determining that the filter outlet pressure sensor is not operating properly, to determine lubricant supply pressure based on filter inlet pressure and a stored value representative of the determined pressure drop across the filter.

4. The system of claim 1, further comprising:

a rotational speed sensor configured to sense motor rotational speed and supply a speed feedback signal representative thereof to the motor control unit.

5. The system of claim 4, wherein the motor control unit selectively implements either the closed-loop pressure control law, which uses the pressure feedback signal to determine actual lubricant supply pressure, or a closed-loop speed control law, which uses the speed feedback signal to determine actual motor rotational speed.

6. The system of claim 1, wherein the one or more signals representative of aircraft operating conditions include:

a signal representative of aircraft altitude; and a signal representative of aircraft attitude.

7. The system of claim 1, further comprising:

an altitude sensor configured to sense aircraft altitude and supply the signal representative thereof; and an attitude sensor configured to sense aircraft attitude and supply the signal representative thereof.

8. The system of claim 1, wherein:

the one or more signals representative of lubricant temperature includes a signal representative of a bearing sump lubricant exit temperature; and wherein the motor control unit selectively implements either the closed-loop pressure control law, which uses the lubricant supply pressure feedback signal to determine actual lubricant supply pressure, or a closed-loop temperature control law, which uses the bearing sump lubricant exit temperature as a feedback signal.

9. The system of claim 1, wherein:

the aircraft lubrication supply system is adapted to be installed in an aircraft having a cooling system with a cooling load;

the motor control unit is further adapted to receive a signal representative of the cooling load; and the motor control unit is further operable to determine the scheduled lubricant supply pressure based at least additionally in part on the cooling load.

10. The system of claim 1, wherein:

the aircraft lubrication supply system is adapted to be installed in an aircraft having an electrical system with an electrical system load;

the motor control unit is further adapted to receive a signal representative of the electrical system load; and the motor control unit is further operable to determine the scheduled lubricant supply pressure based at least additionally in part on the electrical system load.

11. An aircraft lubrication supply system, comprising:

a motor coupled to receive motor speed commands representative of a commanded motor speed and operable, in response thereto, to rotate at the commanded motor speed and supply a drive force;

a pump having at least a fluid inlet and a fluid outlet, the fluid inlet adapted to couple to a lubricant source, the pump coupled to receive the drive force from the motor and configured, in response thereto, to draw lubricant from the lubricant source into the fluid inlet and supply lubricant, via the fluid outlet, to a rotating machine;

a lubricant filter having a filter inlet and a filter outlet, the filter inlet coupled to receive at least a portion of the lubricant supplied via the pump fluid outlet, the lubricant filter configured to filter the lubricant received thereby and discharge filtered lubricant via the filter outlet; and a filter outlet pressure sensor disposed downstream of the filter outlet, the filter outlet pressure sensor configured to sense filter outlet pressure and supply a pressure feedback signal representative thereof;

a rotational speed sensor configured to sense motor rotational speed and supply a speed feedback signal representative thereof; and a motor control unit coupled to receive one or more signals representative of lubricant temperature, a signal representative of rotating machine rotational speed, one or more signals representative of aircraft operating conditions, the speed feedback signal, and the pressure feedback signal, the motor control unit operable to:

(i) determine a scheduled lubricant supply pressure based at least in part on lubricant temperature, the rotating machine rotational speed, and the one or more aircraft operating conditions, (ii) supply motor speed commands to the motor that cause the pump to supply lubricant at the scheduled lubricant supply pressure, (iii) determine actual lubricant supply pressure, (iv) compare the actual lubricant supply pressure to the scheduled lubricant supply pressures, (v) determine operability of the filter outlet pressure sensor, and (vi) implement a closed-loop speed control law, which uses the speed feedback signal to determine actual motor rotational speed, if the filter outlet pressure sensor is determined to be inoperable.

* * * * *

UNITED STATES PATENT AND TRADEMARK OFFICE

CERTIFICATE OF CORRECTION

PATENT NO. : 7,571,597 B2
APPLICATION NO. : 11/339160
DATED : August 11, 2009
INVENTOR(S) : Jim E. Delaloye It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 726 days.

Signed and Sealed this

Fourteenth Day of December, 2010

David J. Kappos

*Director of the United States Patent and Trademark Office*